US007844114B2

(12) United States Patent
Chellapilla et al.

(10) Patent No.: US 7,844,114 B2
(45) Date of Patent: Nov. 30, 2010

(54) LOGICAL STRUCTURE LAYOUT IDENTIFICATION AND CLASSIFICATION FOR OFFLINE CHARACTER RECOGNITION

(75) Inventors: Kumar H. Chellapilla, Redmond, WA (US); Patrice Y. Simard, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 988 days.

(21) Appl. No.: 11/299,873

(22) Filed: Dec. 12, 2005

(65) Prior Publication Data

US 2007/0133883 A1  Jun. 14, 2007

(51) Int. Cl.
*G06K 9/18* (2006.01)
(52) U.S. Cl. .................. 382/185; 382/181; 382/186; 382/187
(58) Field of Classification Search ............. 382/181, 382/189, 185
See application file for complete search history.

(56) References Cited

U.S. PATENT DOCUMENTS 5,768,417 A * 6/1998 Errico et al. ............... 382/186
6,081,621 A * 6/2000 Ackner ...................... 382/216

FOREIGN PATENT DOCUMENTS

JP          11238099 A        8/1998
KR     1019980025571 A        7/1998
KR     1020030052126 A        6/2003

OTHER PUBLICATIONS

International Search Report for PCT/US2006/047291 mailed May 8, 2007. 8 Pages.
PCT Office, "International Search Report & Written Report of the Searching Authority", (May 8, 2007),pp. 1-8.
Liu, Cheng-Lin, et al.; "Online Recognition of Chinese Characters: The State-of-the-Art"; *IEEE Trans. On Pattern Analysis and Machine Intelligence*; Feb. 2004; vol. 26, No. 2.
Shi, D., et al.; "A Radical Approach to Handwritten Chinese Character Recognition Using Active Handwriting Models"; *IEEE Conference on Computer Vision and Pattern Recognition*; 2001; pp. 670-675; Hawaii.
Shi, D, et al.; "Offline Handwritten Chinese Character Recognition by Radical Decomposition"; *ACM Trans. Asian Lang. Inf. Process*; 2003; 2(1): pp. 27-48.
Wang, An-Bang, et al.; "Optical recognition of handwritten Chinese characters by hierarchical radical matching method"; *Pattern Recognition*; Jan. 2001; vol. 34, No. 1; pp. 15-35.

* cited by examiner

*Primary Examiner*—Brian Q Le
*Assistant Examiner*—Edward Park

(57) ABSTRACT

A method and system for implementing character recognition is described herein. An input character is received. The input character is composed of one or more logical structures in a particular layout. The layout of the one or more logical structures is identified. One or more of a plurality of classifiers are selected based on the layout of the one or more logical structures in the input character. The entire character is input into the selected classifiers. The selected classifiers classify the logical structures. The outputs from the selected classifiers are then combined to form an output character vector.

16 Claims, 10 Drawing Sheets

100

| | 2F0 | 2F1 | 2F2 | 2F3 | 2F4 | 2F5 | 2F6 | 2F7 | 2F8 | 2F9 | 2FA | 2FB | 2FC | 2FD |
|---|---|---|---|---|---|---|---|---|---|---|---|---|---|---|
| 0 | 一 | 口 | 士 | 己 | 支 | 比 | 瓜 | 示 | 聿 | 衣 | 辰 | 革 | 南 | 鼻 |
| 1 | 丨 | 刀 | 夂 | 巾 | 攴 | 毛 | 瓦 | 肉 | 而 | 疋 | 韋 | 鬼 | 齊 | |
| 2 | 丶 | 力 | 夊 | 干 | 文 | 氏 | 甘 | 禾 | 臣 | 見 | 邑 | 韭 | 魚 | 齒 |
| 3 | 丿 | 勹 | 夕 | 幺 | 斗 | 气 | 生 | 穴 | 自 | 角 | 酉 | 音 | 鳥 | 龍 |
| 4 | 乙 | 匕 | 大 | 广 | 斤 | 水 | 用 | 立 | 至 | 言 | 采 | 頁 | 鹵 | 龜 |
| 5 | 亅 | 匚 | 女 | 廴 | 方 | 火 | 田 | 竹 | 臼 | 谷 | 里 | 風 | 鹿 | 龠 |
| 6 | 二 | 匸 | 子 | 廾 | 无 | 爪 | 疋 | 米 | 舌 | 豆 | 金 | 飛 | 麥 | |
| 7 | 亠 | 十 | 宀 | 弋 | 日 | 父 | 疒 | 糸 | 舛 | 豕 | 長 | 食 | 麻 | |
| 8 | 人 | 卜 | 寸 | 弓 | 曰 | 爻 | 癶 | 缶 | 舟 | 豸 | 門 | 首 | 黃 | |
| 9 | 儿 | 卩 | 小 | 彐 | 月 | 爿 | 白 | 网 | 艮 | 貝 | 阜 | 香 | 黍 | |
| A | 入 | 厂 | 尢 | 彡 | 木 | 片 | 皮 | 羊 | 色 | 赤 | 隶 | 馬 | 黑 | |
| B | 八 | 厶 | 尸 | 彳 | 欠 | 牙 | 皿 | 羽 | 艸 | 走 | 隹 | 骨 | 黹 | |
| C | 冂 | 又 | 屮 | 心 | 止 | 牛 | 目 | 老 | 虍 | 足 | 雨 | 高 | 黽 | |
| D | 冖 | 口 | 山 | 戈 | 歹 | 犬 | 矛 | 而 | 虫 | 身 | 青 | 髟 | 鼎 | |
| E | 冫 | 囗 | 巛 | 戶 | 殳 | 玄 | 矢 | 耒 | 血 | 車 | 非 | 鬥 | 鼓 | |
| F | 几 | 土 | 工 | 手 | 母 | 玉 | 石 | 耳 | 行 | 辛 | 面 | 鬯 | 鼠 | |

FIG. 1

LOGICAL STRUCTURE LAYOUT IDENTIFICATION AND CLASSIFICATION FOR OFFLINE CHARACTER RECOGNITION

BACKGROUND

Character recognition for East-Asian languages, such as Japanese, Chinese, or Korean, is a challenging pattern-recognition problem. Several aspects of these characters make the problem difficult for conventional machine learning techniques based on Bayesian approaches, neural networks, support vector machines, template matching, and nearest neighbor algorithms. One aspect that contributes to the difficulty is the total number of characters in each of the languages. The number of common characters in an East-Asian language typically ranges from 8,000 to more than 20,000. Several characters are shared among these languages, but the number of unique characters per language is still very large. Current recognition and classification approaches are effective for languages with less than a few hundred classes, such as English, French, and German. However, these approaches do not directly scale to the thousands or even tens of thousands of East-Asian characters.

Another challenge is segmenting an East-Asian character in handwritten form. In handwritten form, strokes may merge into continuous curves. The merging of strokes is so common place that common handwritten character forms have evolved that do no look like their printed counter parts, but allow for easy reading and writing. This common merging of strokes makes stroke segmentation very difficult. Therefore, traditional stroke decomposition approaches that rely on stroke segmentation for character recognition perform poorly on handwritten or cursive characters.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are various technologies and techniques directed to methods and systems for character recognition. In accordance with one implementation of the described technologies, an input character is received at the character recognizer. The input character is composed of one or more logical structures that are in a particular layout. The logical structures may be radicals, characters, or any other collection of one or more strokes. The layout of the logical structures in the input character is identified. The layout may be identified using temporal data, size data, or other data useful for identification. One or more classifiers are selected based on the layout of the logical structures in the input character. The entire character is then input into the selected classifiers. The selected classifiers recognize and classify the logical structures. The outputs from the selected classifiers are then combined to form an output character vector.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 1 is a table illustrating exemplary KangXi radicals.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

East-Asian character systems are typically hierarchical. Each character is made up of one or more strokes. Some of the constituent strokes form commonly occurring sub-characters called radicals. The constituent radicals typically occur in specific locations that are unique to the character. Some radicals are also characters while other radicals never appear by themselves in a language. FIG. 1 shows a table 100 illustrating 214 exemplary KangXi radicals in the Unicode range of [0x2F00-0x2FDF].

Figure 2:
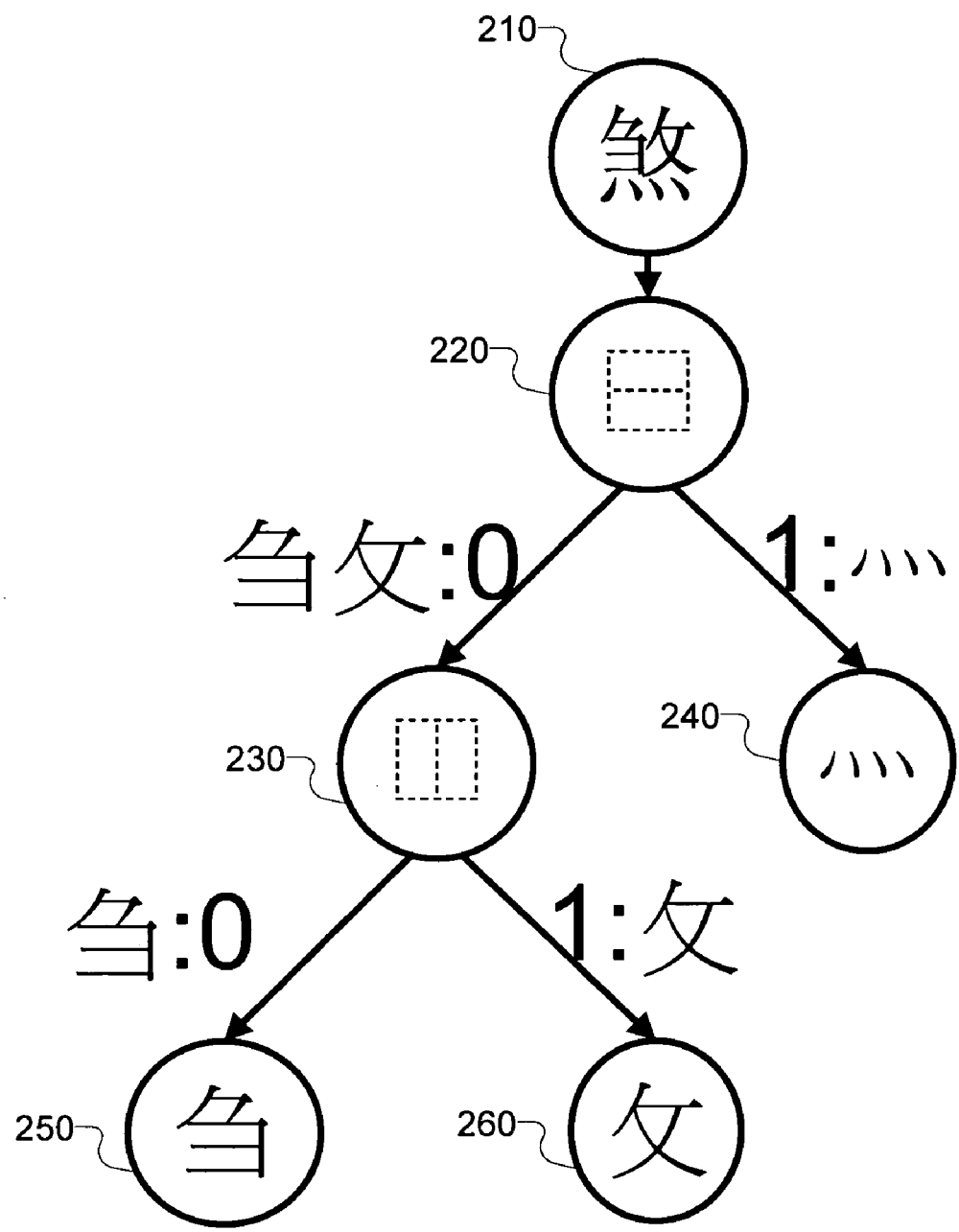
FIG. 2 is a diagram illustrating a decomposition of an exemplary Chinese character.

FIG. 2 is a diagram illustrating a decomposition of an exemplary Chinese character 210 into logical structures. Each logical structure is composed of one or more strokes. A logical structure may be a stroke, a radical, a combination of radicals, or any other collection of one or more strokes. Each logical structure is situated in a particular location in the character. The combination of the logical structures in a particular layout forms the character. In this example, character 210 is composed of three logical structures, 240, 250, and 260. Character 210 may first be decomposed into a top part 230 and a bottom part 240. The top part may then be further decomposed into a left part 250 and a right part 260.

The tree representation shown in FIG. 2 captures the layout of the character 210. Each internal node, such as 220 and 230, is a template node. The templates represent intermediate character layout of logical structures in the character. For example, template 220 represent a top-bottom layout. Template 230 represents a left-right layout. The leaf nodes, such as 240, 250, and 260, represent the simple logical structures that make up the character 210. Any sub-tree represents a partial character, which is also a logical structure.

In the tree representation, one example of a template path is through nodes 220, 230, and 250. This example template path captures the property of the top-left of the character. Example logical structure paths in the tree representation include a path through nodes 220 and 240, a path through nodes 220, 230, and 250, and a path through nodes 220, 230, and 260.

Figure 3:
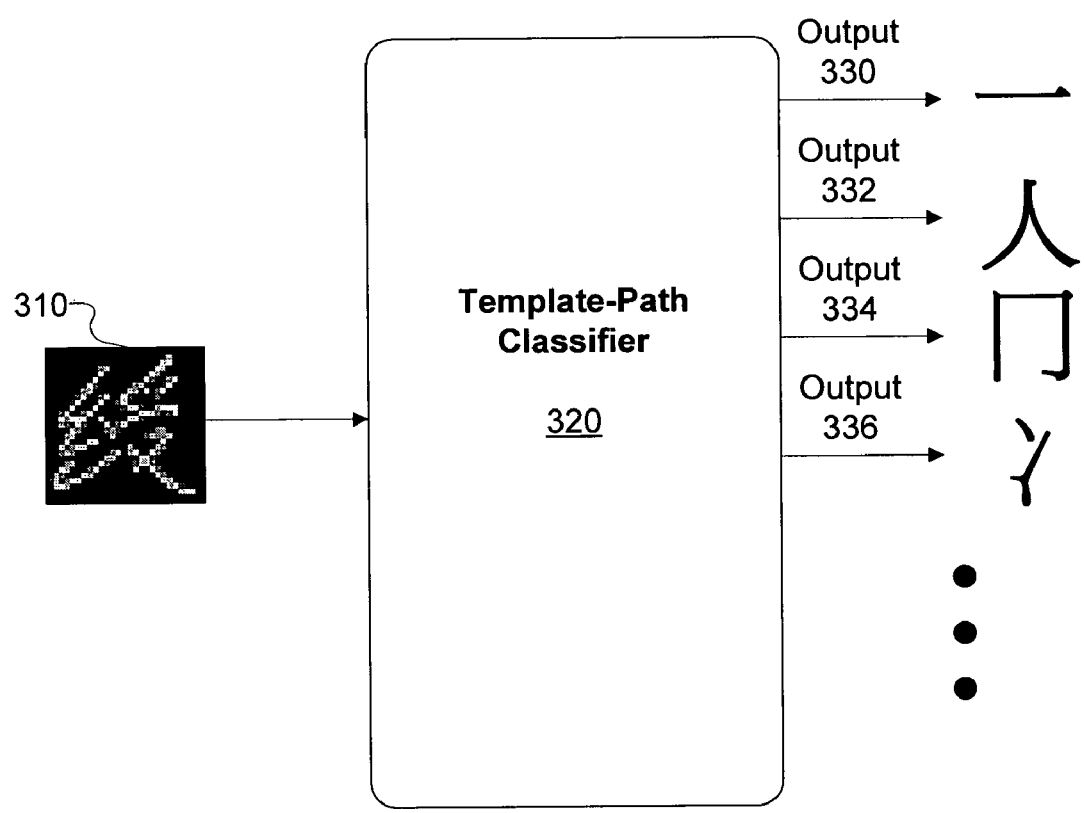
FIG. 3 illustrates an exemplary template-path classifier.

FIG. 3 illustrates an exemplary template-path classifier 320. A unique template-path is associated with the template-path classifier. The template-path classifier looks at the entire character and recognizes the logical structure at the location specified by its template-path. The template-path classifier returns a sequence of scores, probabilities, confidences, or the like. A score, probability, confidence, or the like, is returned for each possible output. The input to the template-path classifier 320 is a character 310 and the output is a logical structure, such as 330, 332, 334, or 336.

Figure 4:
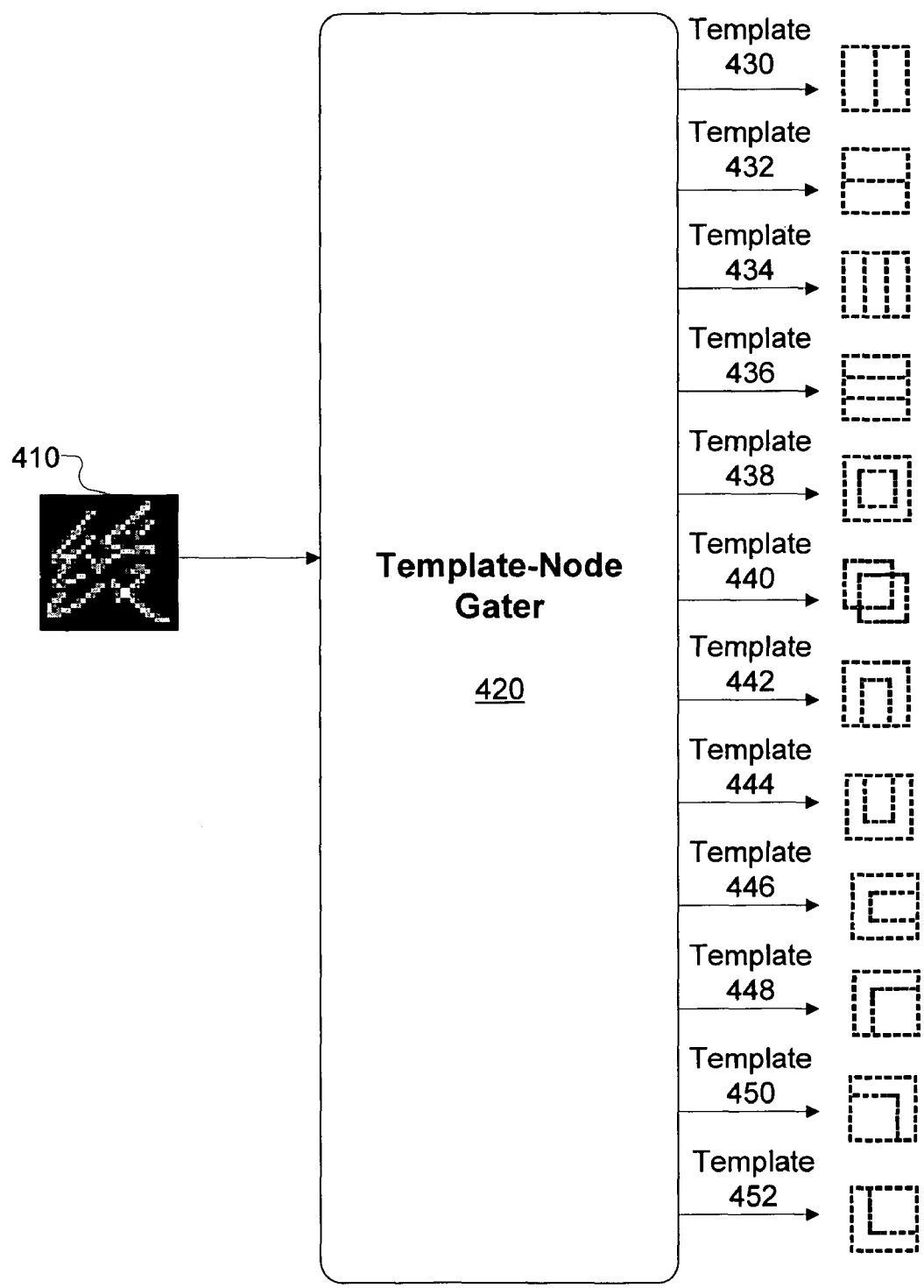
FIG. 4 illustrates an exemplary template-node gater.

FIG. 4 illustrates an exemplary template-node gater 420. The template-node gater examines the entire character 410 and determines the root node template for the character tree. In this example, the gater 420 includes twelve possible output templates, 430-452. For instance, template 430 is a left-right template, template 432 is a top-bottom template, template 434 is a left-middle-right template, template 436 is a top-middle-bottom template, template 438 is an outside-inside template, and so on. Templates other than the ones shown may also be used in the gater. Although twelve output templates are shown in this example, it is understood that a gater may include more templates or fewer templates depending on the chosen implementation.

Figure 5:
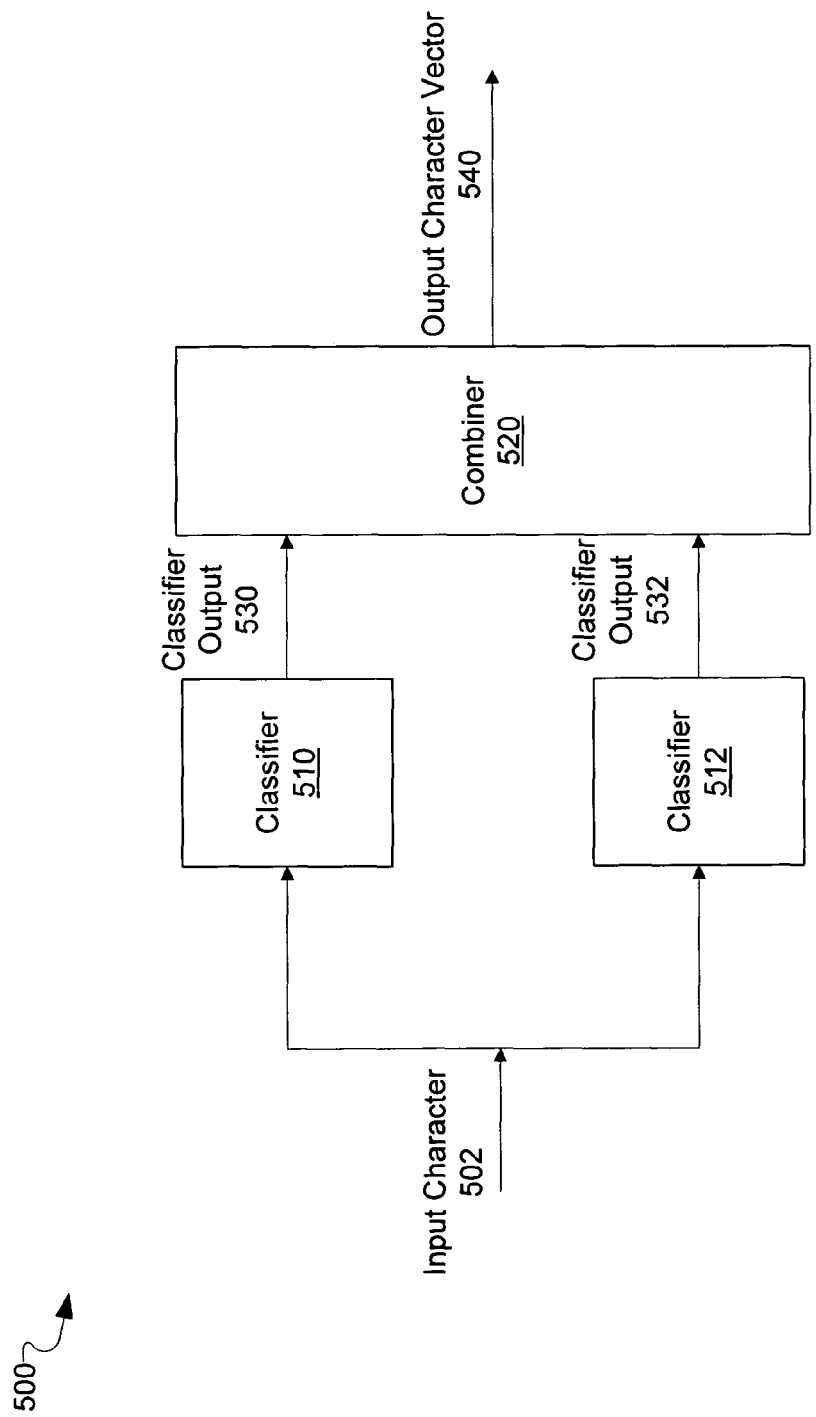
FIG. 5 is a block diagram illustrating an exemplary character recognizer system.

FIG. 5 is a block diagram illustrating an exemplary character recognizer system 500. System 500 includes one or more classifiers, such as 510 and 512, and a combiner 520. Each classifier is associated with a unique template-path. Each classifier examines the entire input character 502 and recognizes the logical structure at the location specified by its template-path. For example, if classifier 510 is a left-classifier and classifier 512 is a right-classifier, then classifier 510 would recognize the logical structure located in the left portion of the input character 502, and classifier 512 would recognize the logical structure located in the right portion of the input character 502. The combiner 520 takes the logical structures output from the classifiers, such as 530 and 532, and combines them to form an output character vector 540. The output character vector 540 may be a vector of character scores, probabilities, confidences, or the like.

Although one level of classification is shown in this example, it is understood that more than one level of classification may be implemented. For example, suppose a character has left and right parts, and the right part of the character has top and bottom parts. The left classifier 510 may be used to recognize the left part of the character, and the right classifier 512 may be used to recognize the right part of the character. The right classifier output 532 may be sent to one or more classifiers, such as a top classifier and a bottom classifier. The top classifier may be used to recognize the top portion of the right part of the character, and the bottom classifier may be used to recognize the bottom portion of the right part of the character. The outputs from the top and bottom classifiers may then be combined to form the right part of the character. The right part of the character may then be combined with the left part of the character recognized by left classifier 510 to form the output character vector 540.

Figure 6:
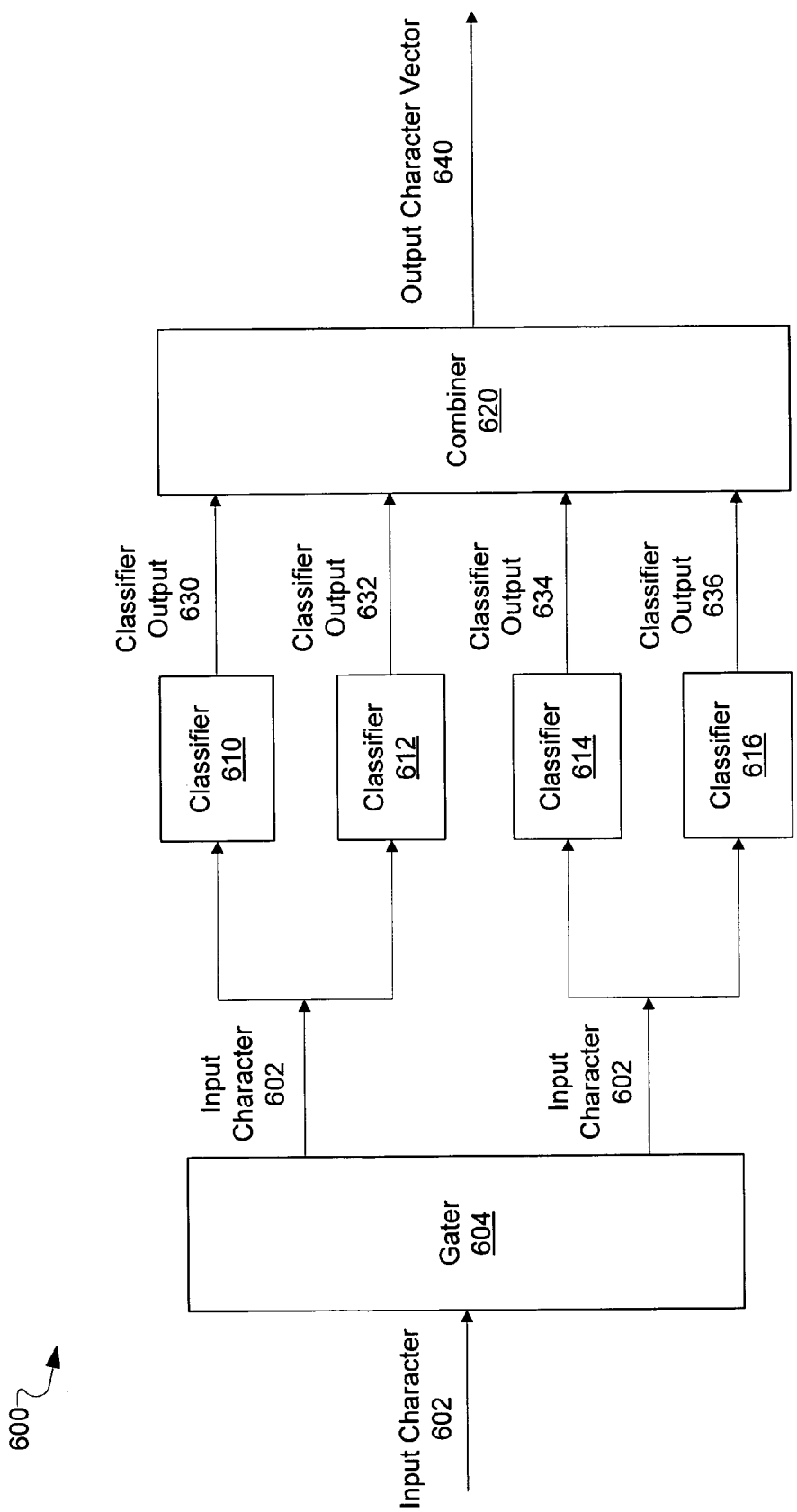
FIG. 6 is a block diagram illustrating another exemplary character recognizer system.

FIG. 6 is a block diagram illustrating an exemplary character recognizer system 600. System 600 includes a template-node gater 604, a plurality of classifiers 610-616, and a combiner 620. The gater 604 examines the entire input character 602 and determines the root node template. The gater may use temporal data, size data, or any other data useful in determining the root node template. For example, by using temporal data, the gater may recognize that a character has left-right parts by recognizing that a user wrote the left part first and then the right part. The gater may recognize that a character has top-bottom parts by recognizing that a user wrote the top part first and then the bottom part. The gater may use also size data to determine the root node template, such as by recognizing that a character has left-right parts because the left portion of the character is bigger than the right portion, or that a character has top-bottom parts because the top portion is stretched in the horizontal direction.

After the gater 604 determines the root node template, the gater 604 sends the entire input character 602 to the one or more classifiers associated with the root node template. For example, if classifier 610 is a left classifier, classifier 612 is a right classifier, classifier 614 is a top classifier, and classifier 616 is a bottom classifier, then gater 604 may send an input character with left-right parts to classifiers 610 and 612, and may send an input character with top-bottom parts to classifiers 614 and 616. The combiner 620 takes the outputs of the classifiers, such as 630, 632, 634, and 636, and combines the outputs into an output character vector 640. The output character vector 640 may be a vector of character scores, probabilities, confidences, or the like.

Figure 7:
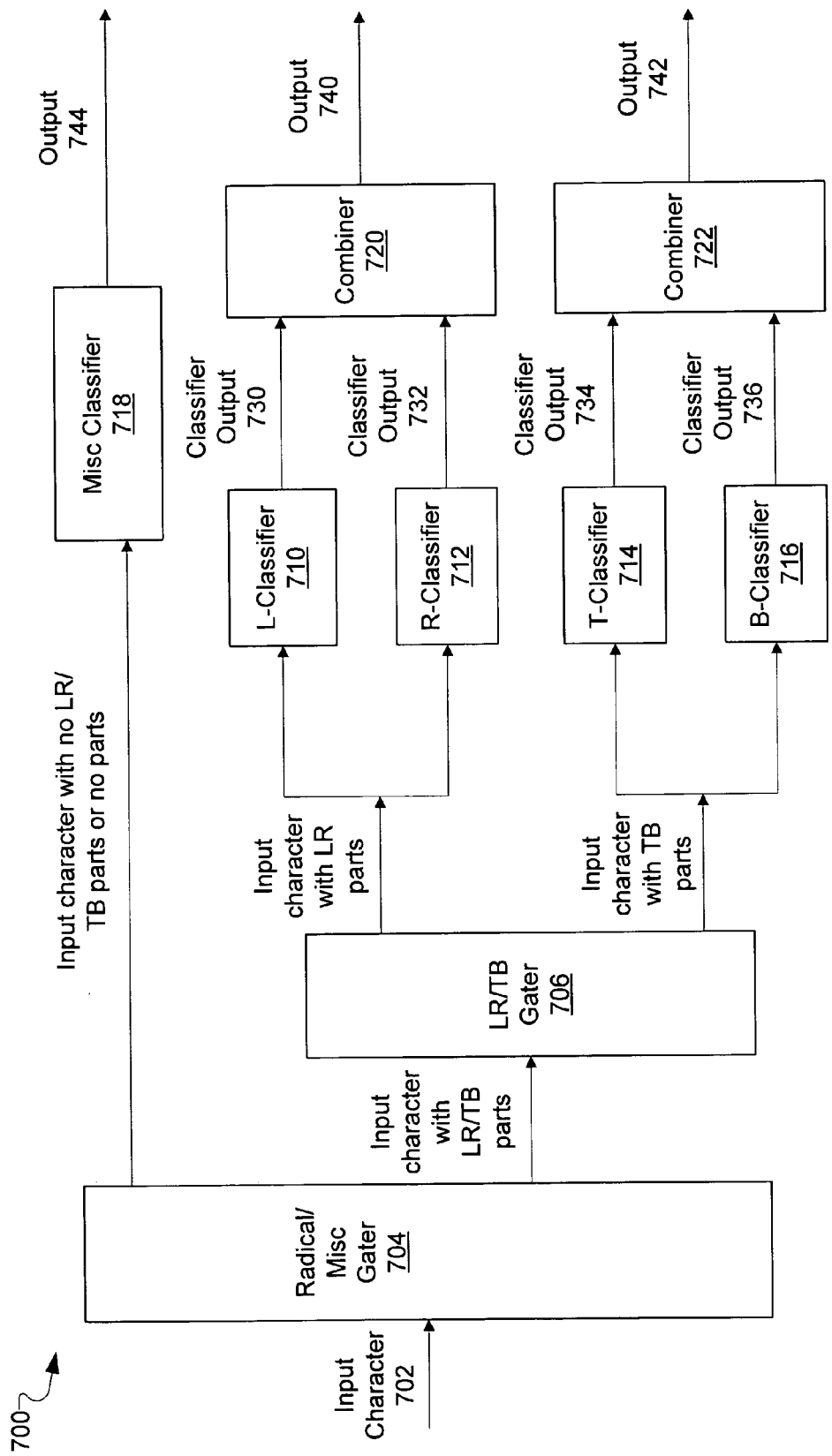
FIG. 7 is a block diagram illustrating yet another exemplary character recognizer system.

FIG. 7 is a block diagram illustrating an exemplary character recognizer system 700. System 700 includes one or more gaters, such as 704 and 706, one or more classifiers, such as 710-718, and one or more combiners, such as 720 and 722. In this example implementation, gater 704 is a radical/miscellaneous gater that identifies whether or not the input character 702 has left-right parts or top-bottom parts. If the input character 702 does not have left-right parts and does not have top-bottom parts, then the input character 702 is sent to miscellaneous classifier 718 for recognition. If the input character 702 has either left-right parts or top-bottom parts, then the input character 702 is sent to gater 706.

Gater 706 determines whether the input character 702 has left-right parts or top-bottom parts. If the input character 702 has left-right parts, then the input character 702 is sent to left-classifier 710 and right-classifier 712 for recognition. The combiner 720 combines the output 730 from left-classifier 710 with the output 732 from the right-classifier 712 to form a character output 740.

If the input character 702 has top-bottom parts, the input character 702 is sent to top-classifier 714 and bottom-classifier 716 for recognition. The combiner 722 combines the output 734 from top-classifier 714 with the output 736 from the bottom-classifier 716 to form a character output 742. The outputs 740, 742, and 744 from the combiner 720, combiner 722, and miscellaneous classifier 718, respectively, may be concatenated to obtain the full output character vector. The full output character vector may be a vector of character scores, probabilities, confidences, or the like.

Although the exemplary implementations shown in FIGS. 5-7 have a specific number of classifiers, gaters, and combiners, it is understood that more or few classifiers, various different combinations of classifiers, more or few gaters, and more or fewer combiners may be used in various other implementations. Furthermore, classifiers associated with template-paths other than the ones shown may be used in other implementations and more than one level of classification may also be used.

Figure 8:
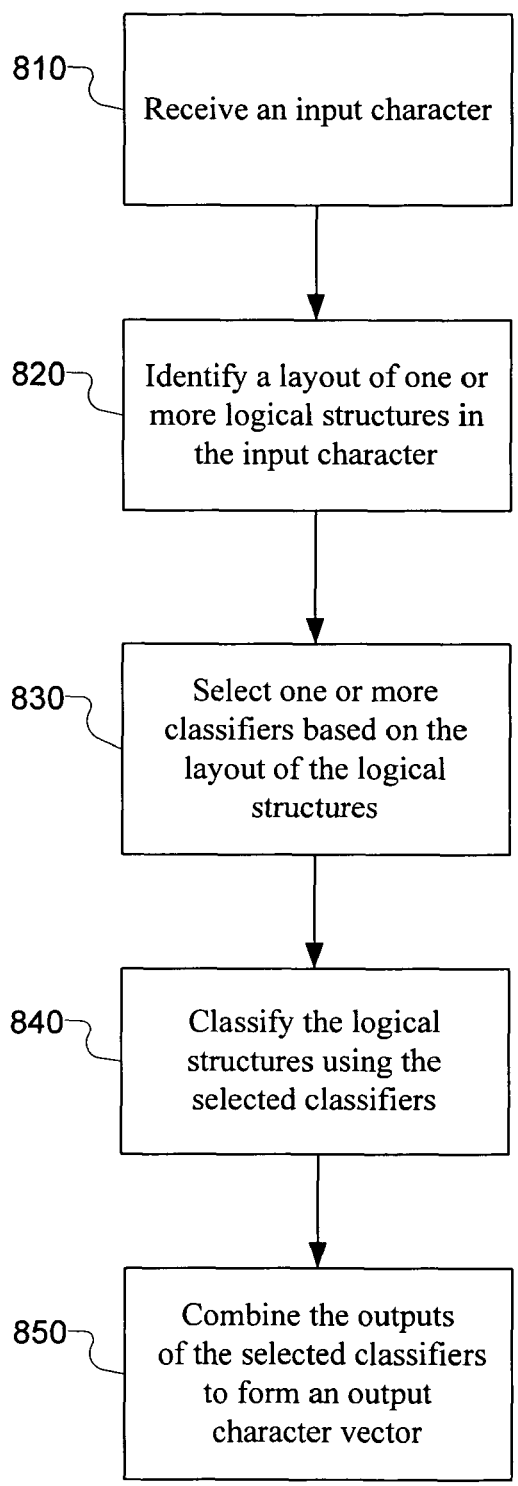
FIG. 8 is a flow diagram illustrating an exemplary process for recognizing a character.
Figure 9:
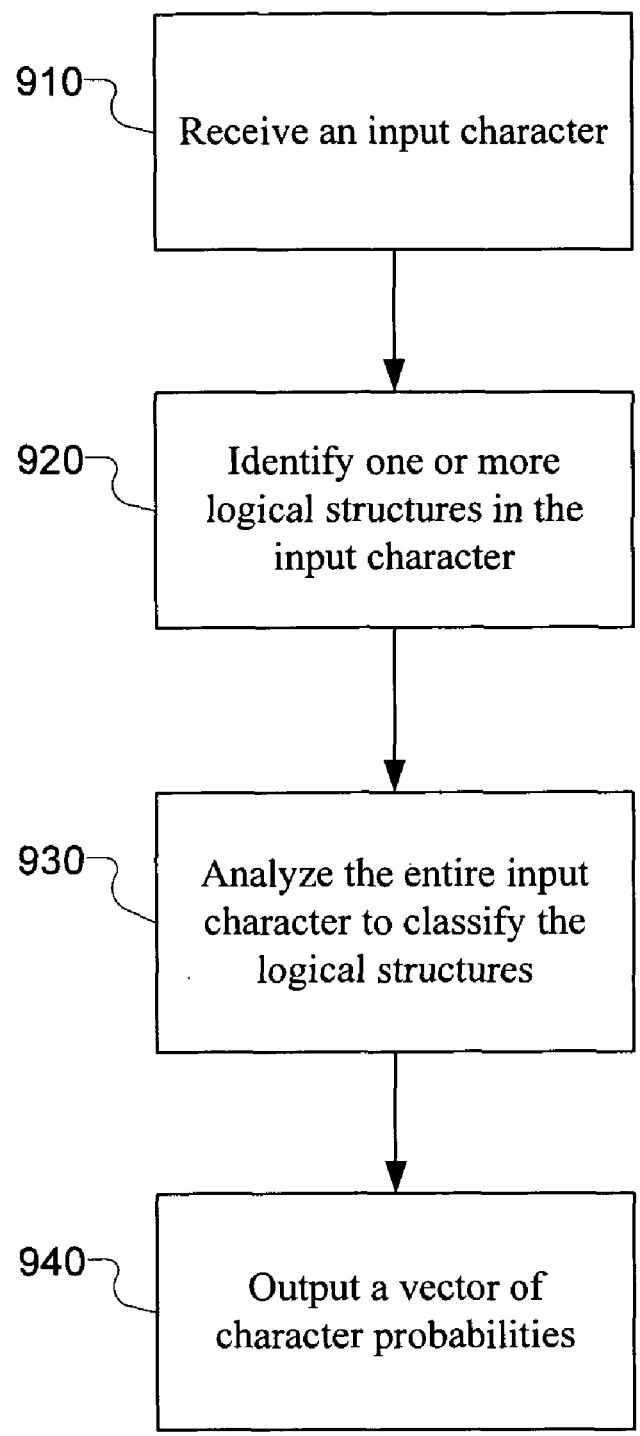
FIG. 9 is a flow diagram illustrating another exemplary process for recognizing a character.

FIGS. 8-9 are flow diagrams illustrating exemplary processes for character recognition. While the description of FIGS. 8-9 may be made with reference to other figures, it should be understood that the exemplary processes illustrated in FIGS. 8-9 are not intended to be limited to being associated with the systems or other contents of any specific figure or figures. Additionally, it should be understood that while the exemplary processes of FIGS. 8-9 indicate a particular order of operation execution, in one or more alternative implementations, the operations may be ordered differently. Furthermore, some of the steps and data illustrated in the exemplary processes of FIGS. 8-9 may not be necessary and may be omitted in some implementations. Finally, while the exemplary processes of FIGS. 8-9 contains multiple discrete steps, it should be recognized that in some environments some of these operations may be combined and executed at the same time.

FIG. 8 is a flow diagram illustrating an exemplary process for recognizing a character. At 810, an input character is received. The input character is composed of one or more logical structures in a particular layout. At 820, the layout of the one or more logical structures in the input character is identified. The layout may be identified by using temporal data, size data, or any other data useful for identification. At 830, one or more of a plurality of classifiers are selected based on the layout of the logical structures in the input character. At 840, the selected classifiers are used to classify the logical structures. The selected classifiers may analyze the entire character to classify the logical structures. At 850, the outputs of the selected classifiers are combined to form an output character vector. The output character vector may be a vector of character scores, probabilities, confidences, or the like.

FIG. 9 is a flow diagram illustrating an exemplary process for recognizing a character. At 910, an input character is received. At 920, one or more logical structures in the input character are identified. The logical structures may be identified by using temporal data, size data, or any other data useful for identification. At 930, the entire input character is analyzed to classify the logical structures. The classified logical structures may then be combined. At 940, a character vector is outputted. The output character vector may be a vector of character scores, probabilities, confidences, or the like.

Figure 10:
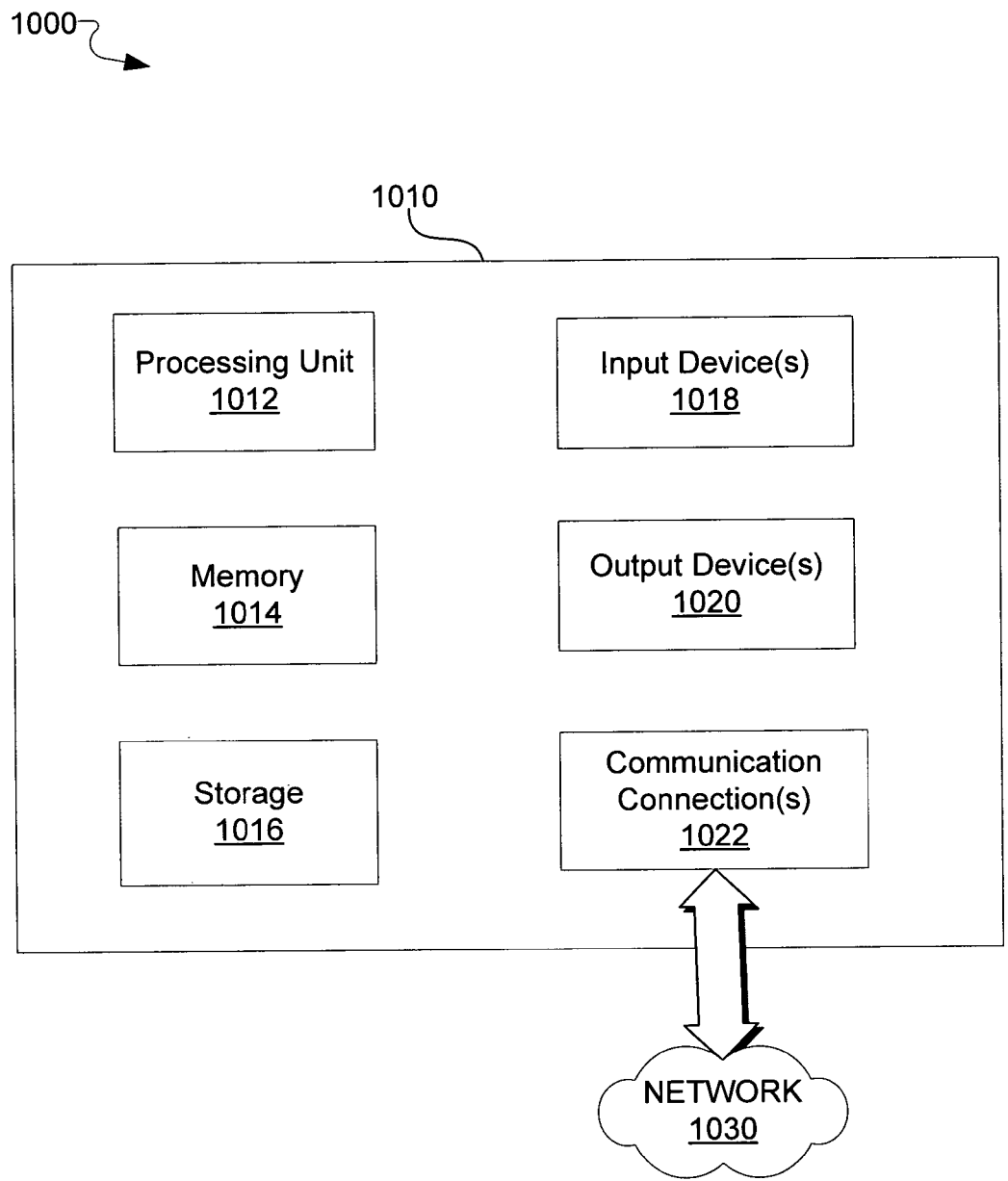
FIG. 10 illustrates an exemplary computing environment in which certain aspects of the invention may be implemented.

FIG. 10 illustrates an exemplary computing environment in which certain aspects of the invention may be implemented. It should be understood that computing environment 1000 is only one example of a suitable computing environment in which the various technologies described herein may be employed and is not intended to suggest any limitation as to the scope of use or functionality of the technologies described herein. Neither should the computing environment 1000 be interpreted as necessarily requiring all of the components illustrated therein.

The technologies described herein may be operational with numerous other general purpose or special purpose computing environments or configurations. Examples of well known computing environments and/or configurations that may be suitable for use with the technologies described herein include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

With reference to FIG. 10, computing environment 1000 includes a general purpose computing device 1010. Components of computing device 1010 may include, but are not limited to, a processing unit 1012, a memory 1014, a storage device 1016, input device(s) 1018, output device(s) 1020, and communications connection(s) 1022.

Processing unit 1012 may include one or more general or special purpose processors, ASICs, or programmable logic chips. Depending on the configuration and type of computing device, memory 1014 may be volatile (such as RAM), non-volatile (such as ROM, flash memory, etc.) or some combination of the two. Computing device 1010 may also include additional storage (removable and/or non-removable) including, but not limited to, magnetic or optical disks or tape. Such additional storage is illustrated in FIG. 10 by storage 1016. Computer storage media includes volatile and nonvolatile, removable and non-removable media implemented in any method or technology for storage of information such as computer readable instructions, data structures, program modules or other data. Memory 1014 and storage 1016 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 1010. Any such computer storage media may be part of computing device 1010.

Computing device 1010 may also contain communication connection(s) 1022 that allow the computing device 1010 to communicate with other devices, such as with other computing devices through network 1030. Communications connection(s) 1022 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes storage media.

Computing device 1010 may also have input device(s) 1018 such as a keyboard, a mouse, a pen, a voice input device, a touch input device, and/or any other input device. Output device(s) 1020 such as one or more displays, speakers, printers, and/or any other output device may also be included.

While the invention has been described in terms of several exemplary implementations, those of ordinary skill in the art will recognize that the invention is not limited to the implementations described, but can be practiced with modification and alteration within the spirit and scope of the appended claims. The description is thus to be regarded as illustrative instead of limiting.

The invention claimed is:

1. A method comprising:

receiving an input character, wherein the input character is composed of logical structures;

identifying a layout of the logical structures in the input character, wherein the one or more logical structures in the input structure are associated with one or more one character layout templates, individual character layout templates representing an intermediate layout of an individual logical structure in the input character;

selecting, from a plurality of classifiers, individual classifiers for individual corresponding logical structures in the input character, wherein the selected individual classifiers comprise:
left-right classifiers to classify at least one left logical structure comprising a left part of the input character and at least one right logical structure comprising a right part of the input character;
top-bottom classifiers to classify at least one top logical structure comprising a top part of the input character and at least one bottom logical structure comprising a bottom part of the input character;
middle classifiers to classify at least one middle logical structure comprising a middle part of the input character between at least two adjacent parts of the input character; or outside-inside classifiers to classify at least one outside logical structure comprising an outside part of the input character and at least one inside logical structure comprising an inside part of the input character;
classifying the individual logical structures using the selected individual classifiers to generate one or more outputs;
combining the one or more outputs from the one or more selected classifiers to form an output character vector; and
wherein the selecting, classifying and combining are implemented at least in part by at least one processing unit.

2. The method of claim 1, wherein identifying the layout comprises identifying the layout based on temporal data.

3. The method of claim 1, wherein identifying the layout comprises identifying the layout based on size data.

4. The method of claim 1, wherein classifying the logical structures comprises classifying the one or more logical structures by analyzing the entire input character.

5. The method of claim 1, wherein selecting the individual classifiers comprises selecting the individual classifiers using a template-node gater.

6. The method of claim 1, wherein the output character vector is a vector of character scores.

7. A system comprising:
a plurality of classifiers to classify logical structures of an input character;
a gater implemented at least in part by a processing unit, wherein the gater is coupled to the plurality of classifiers to receive the input character and to select individual classifiers of the plurality of classifiers based on a spatial arrangement of the logical structures in the input character, wherein the selected individual classifiers comprise:
left-right classifiers to classify at least one left logical structure comprising a left part of the input character and at least one right logical structure comprising a right part of the input character;
top-bottom classifiers to classify at least one top logical structure comprising a top part of the input character and at least one bottom logical structure comprising a bottom part of the input character;
middle classifiers to classify at least one middle logical structure comprising a middle part of the input character between at least two adjacent parts of the input character; or
outside-inside classifiers to classify at least one outside logical structure comprising an outside part of the input character and at least one inside logical structure comprising an inside part of the input character; and
a combiner coupled to the plurality of classifiers to receive outputs of the selected individual classifiers and to combine the outputs into an output character vector.

8. The system of claim 7, wherein the gater is configured to select the individual classifiers based on temporal data.

9. The system of claim 7, wherein the gater is configured to select the individual classifiers based on size data.

10. The system of claim 7, wherein the individual classifiers are configured to classify the logical structures by analyzing the entire input character.

11. The system of claim 7, wherein one or more of the individual classifiers are configured to output a vector of logical structure scores.

12. The system of claim 11, wherein the combiner is configured to combine vectors of logical structure scores output from the one or more individual classifiers to generate a corresponding vector of character scores.

13. A method comprising:
selecting individual classifiers of a plurality of classifiers for classifying logical structures of an input character based on a spatial arrangement of the logical structures in the input character, wherein the selected individual classifiers comprise:
left-right classifiers to classify at least one left logical structure comprising a left part of the input character and at least one right logical structure comprising a right part of the input character;
top-bottom classifiers to classify at least one top logical structure comprising a top part of the input character and at least one bottom logical structure comprising a bottom part of the input character;
middle classifiers to classify at least one middle logical structure comprising a middle part of the input character between at least two adjacent parts of the input character; or
outside-inside classifiers to classify at least one outside logical structure comprising an outside part of the input character and at least one inside logical structure comprising an inside part of the input character;
receiving outputs of the selected individual classifiers and combining the outputs into an output character vector; and
wherein the selecting and combining are implemented at least in part by at least one processing unit.

14. The method of claim 13, wherein selecting individual classifiers is based on temporal data.

15. The method of claim 13, wherein selecting individual classifiers is based on size data.

16. At least one computer-readable storage medium embodying computer-readable instructions which, when executed by the processing unit, implement the method of claim 13, wherein the at least one computer-readable storage medium comprises at least one of:
RAM, ROM, EEPROM, flash memory, CD-ROM, a digital versatile disks (DVD) or other optical storage, or a magnetic storage device.

* * * * *